(12) United States Patent
Kaneko et al.

(10) Patent No.: US 9,624,079 B2
(45) Date of Patent: Apr. 18, 2017

(54) FORKLIFT AND CONTROL METHOD OF FORKLIFT

(71) Applicant: Komatsu Ltd., Tokyo (JP)

(72) Inventors: Shinji Kaneko, Oyama (JP); Taishi Oiwa, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/363,015

(22) PCT Filed: Dec. 27, 2013

(86) PCT No.: PCT/JP2013/085266
§ 371 (c)(1),
(2) Date: Jun. 5, 2014

(87) PCT Pub. No.: WO2015/097911
PCT Pub. Date: Jul. 2, 2015

(65) Prior Publication Data
US 2016/0289055 A1    Oct. 6, 2016

(51) Int. Cl.
| B66F 9/075 | (2006.01) |
| B66F 9/22 | (2006.01) |
| F16H 61/431 | (2010.01) |
| F16H 61/421 | (2010.01) |

(52) U.S. Cl.
CPC ............ B66F 9/07572 (2013.01); B66F 9/22 (2013.01); F16H 61/421 (2013.01); F16H 61/431 (2013.01); *F15B 2211/20546* (2013.01); *F15B 2211/20553* (2013.01); *F16H 2312/10* (2013.01)

(58) Field of Classification Search
CPC ........ B66F 9/07572; B66F 9/22; F16H 61/42; F16H 61/431–61/437; F16H 61/439; F16H 2312/10; F15B 2211/20546; F15B 2211/20553
See application file for complete search history.

(56) References Cited

U.S. PATENT DOCUMENTS

| 2009/0320462 A1 | 12/2009 | Ohtsukasa |
| 2011/0197699 A1 | 8/2011 | Lee |
| 2013/0259622 A1 | 10/2013 | Shirao |

FOREIGN PATENT DOCUMENTS

| CN | 1559826 A | 1/2005 |
| CN | 201415932 Y | 3/2010 |
| CN | 201606326 U | 10/2010 |
| CN | 201713285 U | 1/2011 |
| CN | 102216197 A | 10/2011 |
| CN | 202851161 U | 4/2013 |

(Continued)

OTHER PUBLICATIONS

International Search Report dated Apr. 1, 2014, issued for PCT/JP2013/085266.

*Primary Examiner* — Spencer Patton
(74) *Attorney, Agent, or Firm* — Locke Lord LLP

(57) ABSTRACT

A forklift includes a variable displacement hydraulic pump driven by an engine, a hydraulic motor that forms a closed circuit with the hydraulic pump therebetween and is driven by hydraulic oil discharged from the hydraulic pump, and driving wheels driven by the hydraulic motor. A control device of the forklift determines a rate of increase of an inching rate, based on at least one of an accelerator opening, a brake opening indicating an operation amount of a brake pedal, a change speed of the brake opening, and a vehicle speed detected by a vehicle speed sensor.

10 Claims, 6 Drawing Sheets

(56) References Cited

FOREIGN PATENT DOCUMENTS

| | | |
|---|---|---|
| CN | 203255168 U | 10/2013 |
| JP | 2001-254826 A | 9/2001 |
| JP | 2008-180274 A | 8/2008 |
| JP | 5092069 B1 | 12/2012 |
| JP | 5144844 B1 | 2/2013 |

FIG.7

| As | As1 | As2 | ... | Asj | MP |
|----|-----|-----|-----|-----|----|
| f  | f1  | f2  | ... | fj  |    |

FORKLIFT AND CONTROL METHOD OF FORKLIFT

FIELD

The present invention relates to a forklift having a variable displacement hydraulic pump driven by an engine, and a hydraulic motor which forms a closed circuit with the hydraulic pump therebetween and is driven by hydraulic oil discharged from the hydraulic pump, and a method of controlling the forklift.

BACKGROUND

There are forklifts having a hydraulic driving device referred to as a hydro static transmission (HST) provided between an engine as a driving source and driving wheels. The hydraulic driving device includes a variable displacement hydraulic pump driven by the engine, and a variable displacement hydraulic motor driven by hydraulic oil discharged from the hydraulic pump in a main hydraulic circuit as a closed circuit, and allows a vehicle to travel by transmitting driving of the hydraulic motor to the driving wheels.

The forklift to which such a hydraulic driving device is applied also includes a working hydraulic pump driven by the engine, and drives a working machine by supplying the hydraulic oil to a working machine actuator from the working hydraulic pump. In such a forklift, inching control to increase and decrease an absorption torque of the hydraulic pump is performed (for example, Patent Literature 1).

CITATION LIST

Patent Literature

Patent Literature 1: Japanese Patent No. 5144844

SUMMARY

Technical Problem

As a work of a forklift to perform inching control, for example, there is a work of stepping on an accelerator pedal in a state of stepping on a brake pedal (vehicle stop state) to increase a rotational speed of an engine, thereby moving the fork to perform a loading and unloading work. Furthermore, there is a work of stepping on the accelerator pedal in a state of stepping on a brake pedal (vehicle stop state) to increase the engine rotational speed, and then by rapidly releasing the brake pedal, pushing a transported article with the fork or pulling out the fork from a gap of the load.

Patent Literature 1 discloses inching control suitable for a case of performing a pushing work and a pulling work peculiar to the forklift. In addition to this, in a work of a forklift including HST, there are various aspects, such as a case where the brake pedal is returned in an attempt to weaken deceleration force after stepping on the brake pedal, a case where the accelerator pedal is further stepped on thereafter, a case where an operator releases the brake pedal too much by mistake when performing the loading and unloading work while traveling or the like.

An object of the invention is to achieve appropriate inching control in the work using a forklift having the HST.

Solution to Problem

According to the present invention, a forklift that includes a variable displacement hydraulic pump driven by an engine, a hydraulic motor that forms a closed circuit with the hydraulic pump therebetween and is driven by hydraulic oil discharged from the hydraulic pump, and driving wheels driven by the hydraulic motor, the forklift comprises: a vehicle speed sensor configured to detect a vehicle speed of the forklift; an accelerator opening sensor configured to detect an accelerator opening that indicates an operation amount of an accelerator pedal for changing an amount of fuel supplied to the engine; a brake pedal that is used to brake the forklift and controls an inching rate which is a reduction ratio resulting from a tilting angle of a swash plate of the hydraulic pump; an inching rate calculation unit configured to calculate the inching rate corresponding to an operation amount of the brake pedal; and an inching rate increase speed calculation unit configured to determine a rate of increase of the inching rate, based on at least one of the accelerator opening, a brake opening indicating the operation amount of the brake pedal, a rate of change of the brake opening, and the vehicle speed detected by the vehicle speed sensor.

In the present invention, it is preferable that in a state in which the accelerator opening is less than a predetermined accelerator opening threshold, the rate of increase of the inching rate in a case where the vehicle speed is equal to or less than a predetermined vehicle speed threshold is smaller than the rate of increase of the inching rate in a case where the vehicle speed is higher than the vehicle speed threshold.

In the present invention, it is preferable that in a state in which the accelerator opening is equal to or greater than a predetermined accelerator opening threshold and the brake opening is equal to or greater than a predetermined opening threshold, the rate of increase of the inching rate in a case where the rate of change of the brake opening is equal to or greater than a predetermined opening change threshold is smaller than the rate of increase of the inching rate in a case where the rate of change of the brake opening is less than the opening change threshold.

In the present invention, it is preferable that in a state in which the accelerator opening is equal to or greater than a predetermined accelerator opening threshold and the brake opening is equal to or greater than a predetermined brake opening threshold, the rate of increase of the inching rate in a case where the rate of change of the brake opening is equal to or greater than a predetermined opening change threshold increases in accordance with an increase in the accelerator opening.

In the present invention, it is preferable that in a state in which the accelerator opening is equal to or greater than a predetermined accelerator opening threshold and the brake opening is less than a predetermined brake opening threshold, the rate of increase of the inching rate is determined by a map of the rate of increase of the inching rate that is set depending on the accelerator opening.

In the present invention, it is preferable that the rate of increase of the inching rate increases in accordance with an increase in the accelerator opening.

According to the present invention, a method of controlling a forklift including a variable displacement hydraulic pump driven by an engine, a hydraulic motor that forms a closed circuit with the hydraulic pump therebetween and is driven by hydraulic oil discharged from the hydraulic pump, and driving wheels driven by the hydraulic motor, the method comprises: determining a rate of increase of an inching rate as a reduction ratio resulting from a tilting angle of a swash plate included in the hydraulic pump, based on at least one of an accelerator opening indicating an operation amount of an accelerator pedal for changing an amount of fuel supplied to the engine, a brake opening indicating an operation amount of a brake pedal used for braking the forklift, a rate of change of the brake opening, and a vehicle speed of the forklift detected by a vehicle speed sensor.

In the present invention, it is preferable that in a state in which the accelerator opening is less than a predetermined accelerator opening threshold, the rate of increase of the inching rate in a case where the vehicle speed is equal to or less than a predetermined vehicle speed threshold is smaller than the rate of increase of the inching rate in a case where the vehicle speed is higher than the vehicle speed threshold.

In the present invention, it is preferable that in a state in which the accelerator opening is equal to or greater than a predetermined accelerator opening threshold and the brake opening is equal to or greater than a predetermined opening threshold, the rate of increase of the inching rate in a case where the rate of change of the brake opening is equal to or greater than a predetermined opening change threshold is smaller than the rate of increase of the inching rate in a case where the rate of change of the brake opening is less than the opening change threshold.

In the present invention, it is preferable that in a state in which the accelerator opening is equal to or greater than a predetermined accelerator opening threshold and the brake opening is equal to or greater than a predetermined brake opening threshold, the rate of increase of the inching rate in a case where the rate of change of the brake opening is equal to or greater than a predetermined opening change threshold increases in accordance with an increase in the accelerator opening.

In the present invention, it is preferable that in a state in which the accelerator opening is equal to or greater than a predetermined accelerator opening threshold and the brake opening is less than a predetermined brake opening threshold, the rate of increase of the inching rate is determined by a map of the rate of increase of the inching rate that is set depending on the accelerator opening.

In the present invention, it is preferable that the rate of increase of the inching rate increases in accordance with an increase in the accelerator opening.

The invention is able to achieve appropriate inching control in the work using a forklift having a HST.

BRIEF DESCRIPTION OF DRAWINGS

FIG. 7 is a diagram illustrating an example of a map of the rate of increase of the inching used in a state in which an accelerator opening is equal to or greater than a predetermined accelerator opening threshold and a brake opening is less than a predetermined brake opening threshold.

DESCRIPTION OF EMBODIMENTS

An aspect (embodiment) for carrying out the invention will be described in detail with reference to the drawings.

Figure 1:
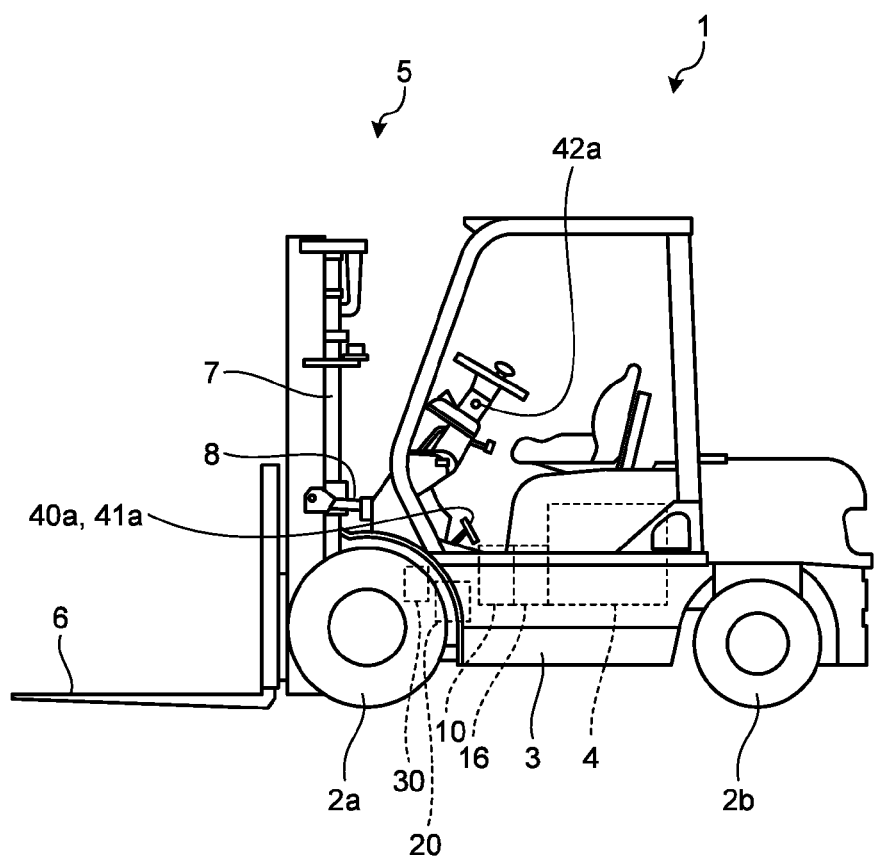
FIG. 1 is a diagram illustrating an overall configuration of a forklift according to an embodiment.
Figure 2:
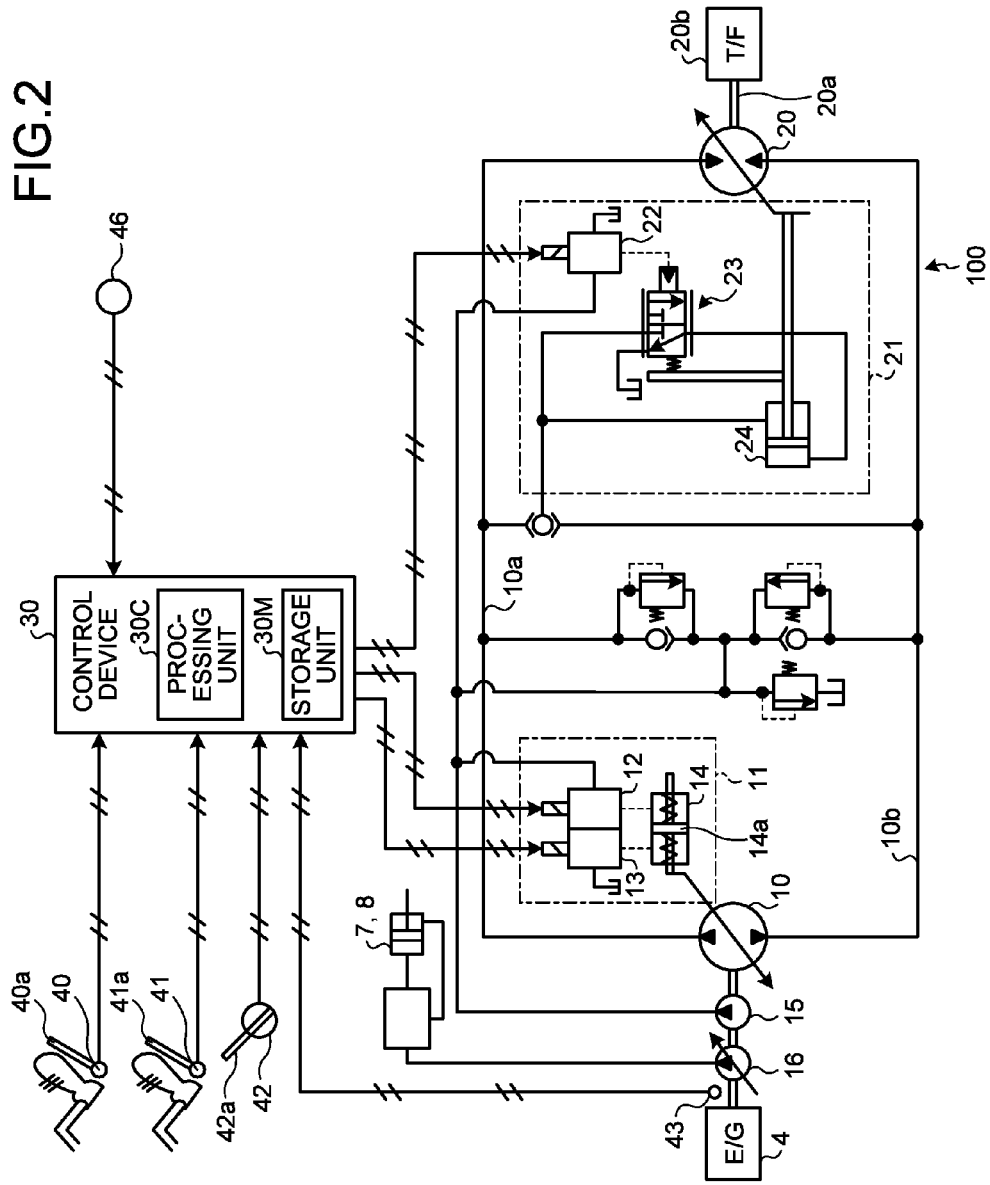
FIG. 2 is a block diagram illustrating a control system of the forklift illustrated in FIG. 1.
Figure 3:
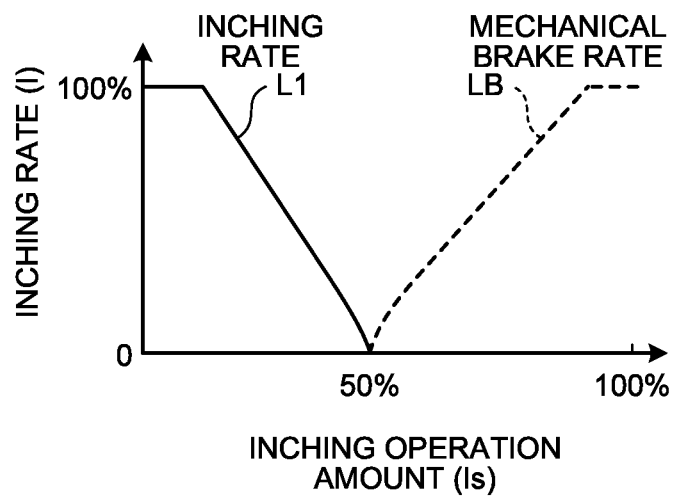
FIG. 3 is a diagram illustrating a change in an inching rate with respect to an inching operation amount.

FIG. 1 is a diagram illustrating an overall configuration of a forklift according to an embodiment. FIG. 2 is a block diagram illustrating a control system of the forklift illustrated in FIG. 1. FIG. 3 is a diagram illustrating a change in an inching rate with respect to an inching operation amount. A forklift 1 has a vehicle body 3 having driving wheels 2a and steering wheels 2b, and a working machine 5 provided in front of the vehicle body 3. The vehicle body 3 is provided with an engine 4 as an internal combustion engine, a variable displacement hydraulic pump 10 configured to drive the engine 4 as a driving source, and a variable displacement working machine hydraulic pump 16. The driving wheels 2a are driven by power of a hydraulic motor 20, by allowing the variable displacement hydraulic pump 10 and a variable displacement hydraulic motor 20 to communicate with each other by a closed hydraulic circuit. In this way, the forklift 1 travels by the HST. In this embodiment, the hydraulic pump 10 and the working machine hydraulic pump 16 have swash plates, and capacities thereof change by an alteration of a tilting angle of the swash plate.

The working machine 5 has a lift cylinder 7 configured to raise and lower a fork 6, and a tilt cylinder 8 configured to tilt the fork 6. A driver's seat of the vehicle body 3 is provided with a forward-reverse lever 42a, a brake pedal (an inching pedal) 40a, an accelerator pedal 41a, and a working machine operation lever (not illustrated) including a lift lever and a tilt lever for operating the working machine 5. The brake pedal 40a and the accelerator pedal 41a are provided at a position where an operator of the forklift 1 is capable of performing stepping operation from the driver's seat. In FIG. 1, the inching pedal 40a and the accelerator pedal 41a are drawn in an overlapped state.

As illustrated in FIG. 2, the forklift 1 includes the hydraulic pump 10 and the hydraulic motor 20 connected by hydraulic supply lines 10a and 10b of a main hydraulic circuit 100 serving as a closed circuit. The hydraulic pump 10 (hereinafter, appropriately referred to as an HST pump 10) is a device that is driven by the engine 4 to discharge the hydraulic oil. In this embodiment, the HST pump 10 is, for example, a variable displacement pump capable of changing the capacity by changing the swash plate tilting angle.

The hydraulic motor 20 (hereinafter, appropriately referred to as HST motor 20) is driven by the hydraulic oil discharged from the HST pump 10. The hydraulic motor 20 is, for example, a variable displacement hydraulic motor capable of changing the capacity by changing the swash plate tilting angle. The HST motor 20 may also be a fixed displacement hydraulic motor. An output shaft 20a of the HST motor 20 is connected to the driving wheels 2a via a transfer 20b, and the HST motor 20 can drive the forklift 1 by rotationally driving the driving wheels 2a.

The HST motor 20 is capable of switching a rotation direction depending on a supply direction of the hydraulic oil from the HST pump 10. The rotation direction of the HST motor 20 is switched, which can move the forklift 1 forward or backward. In the following description, for convenience, it is assumed that when the hydraulic oil is supplied to the HST motor 20 from the hydraulic supply line 10a, the forklift 1 moves forward, and when the hydraulic oil is supplied to the HST motor 20 from the hydraulic supply line 10b, the forklift 1 moves backward.

The forklift 1 has a pump capacity setting unit 11, a motor capacity setting unit 21, and a charge pump 15. The pump capacity setting unit 11 is provided in the HST pump 10. The pump capacity setting unit 11 includes a forward pump electromagnetic proportional control valve 12, a reverse pump electromagnetic proportional control valve 13, and a pump capacity control cylinder 14. In the pump capacity setting unit 11, a command signal is applied to the forward pump electromagnetic proportional control valve 12 and the reverse pump electromagnetic proportional control valve 13 from a control device 30 which will be described below. In the pump capacity setting unit 11, the pump capacity control cylinder 14 is operated according to the command signal applied from the control device 30, the swash plate tilting angle of the HST pump 10 changes, and thus, the capacity thereof changes.

The pump capacity control cylinder 14 is configured so that a piston 14a is held in a neutral state in a state of a swash plate tilting angle of 0. Therefore, even if the engine 4 turns, an amount of hydraulic oil discharged to the main hydraulic circuit 100 from the HST pump 10 is zero.

From the state in which the swash plate tilting angle of the HST pump 10 is 0, for example, when a command signal for increasing the capacity of the HST pump 10 is applied to the forward pump electromagnetic proportional control valve 12 from the control device 30, the pump control pressure is supplied to the pump capacity control cylinder 14 from the forward pump electromagnetic proportional control valve 12 according to the command signal. As a result, the piston 14a moves to the left side in FIG. 2. When the piston 14a of the pump capacity control cylinder 14 moves to the left side in FIG. 2, the swash plate of the HST pump 10 is tilted toward a direction of discharging the hydraulic oil to the hydraulic supply line 10a in conjunction with this operation.

As the pump control pressure from the forward pump electromagnetic proportional control valve 12 increases, the amount of movement of the piston 14a increases. For this reason, an amount of change in the tilting angle of the swash plate in the HST pump 10 also increases. That is, when the command signal is applied to the forward pump electromagnetic proportional control valve 12 from the control device 30, the pump control pressure depending on the command signal is supplied to the pump capacity control cylinder 14 from the forward pump electromagnetic proportional control valve 12. The pump capacity control cylinder 14 is operated by above-described pump control pressure, and thus the swash plate of the HST pump 10 is tilted so as to be able to discharge a predetermined amount of hydraulic oil to the hydraulic supply line 10a. As a result, if the engine 4 turns, the hydraulic oil is discharged to the hydraulic supply line 10a from the HST pump 10, and the HST motor 20 rotates in the forward direction.

In the above-described state, when a command signal for reducing the capacity of the HST pump 10 is applied to the forward pump electromagnetic proportional control valve 12 from the control device 30, the pump control pressure supplied to the pump capacity control cylinder 14 from the forward pump electromagnetic proportional control valve 12 depending on the command signal decreases. For this reason, the piston 14a of the pump capacity control cylinder 14 moves toward the neutral position. As a result, the swash plate tilting angle of the HST pump 10 decreases, and an amount of discharge of the hydraulic oil to the hydraulic supply line 10a from the HST pump 10 decreases.

When the control device 30 applies the command signal for increasing the capacity of the HST pump 10 to the reverse pump electromagnetic proportional control valve 13, the pump control pressure is supplied to the pump capacity control cylinder 14 from the reverse pump electromagnetic proportional control valve 13 depending on the command signal. Then, the piston 14a moves to the right side in FIG. 2. When the piston 14a of the pump capacity control cylinder 14 moves to the right side in FIG. 2, the swash plate of the HST pump 10 is tilted toward a direction of discharging the hydraulic oil to the hydraulic supply line 10b in conjunction with this operation.

As the pump control pressure supplied from the reverse pump electromagnetic proportional control valve 13 increases, an amount of movement of the piston 14a increases, and thus, an amount of change in the swash plate tilting angle of the HST pump 10 increases. That is, when the command signal is applied to the reverse pump electromagnetic proportional control valve 13 from the control device 30, the pump control pressure depending on the command signal is applied to the pump capacity control cylinder 14 from the reverse pump electromagnetic proportional control valve 13. Moreover, the swash plate of the HST pump 10 is tilted so as to be able to discharge a desired amount of hydraulic oil to the hydraulic supply line 10b by the operation of the pump capacity control cylinder 14. As a result, when the engine 4 turns, the hydraulic oil is discharged to the hydraulic supply line 10b from the HST pump 10, and the HST motor 20 rotates in the reverse direction.

When the command signal for reducing the capacity of the HST pump 10 is applied to the reverse pump electromagnetic proportional control valve 13 from the control device 30, the pump control pressure supplied to the pump capacity control cylinder 14 from the reverse pump electromagnetic proportional control valve 13 depending on the command signal decreases, and the piston 14a moves toward the neutral position. As a result, since the swash plate tilting angle of the HST pump 10 decreases, an amount of hydraulic oil discharged to the hydraulic supply line 10b from the HST pump 10 decreases.

The motor capacity setting unit 21 is provided in the HST motor 20. The motor capacity setting unit 21 includes a motor electromagnetic proportional control valve 22, a motor cylinder control valve 23, and a motor capacity control cylinder 24. In the motor capacity setting unit 21, when the command signal is applied to the motor electromagnetic proportional control valve 22 from the control device 30, the motor control pressure is supplied to the motor cylinder control valve 23 from the motor electromagnetic proportional control valve 22, and the motor capacity control cylinder 24 is operated. When the motor capacity control cylinder 24 is operated, the swash plate tilting angle of the HST motor 20 changes in conjunction with this operation. For this reason, the capacity of the HST motor 20 changes depending on a command signal from the control device 30. More specifically, the motor capacity setting unit 21 is configured so that as a motor control pressure supplied from the motor electromagnetic proportional control valve 22 increases, the swash plate tilting angle of the HST motor 20 decreases.

The charge pump 15 is driven by the engine 4. The charge pump 15 supplies the pump control pressure to the pump capacity control cylinder 14 via the forward pump electromagnetic proportional control valve 12 and the reverse pump electromagnetic proportional control valve 13 described above. Furthermore, the charge pump 15 has a function of supplying the motor control pressure to the motor cylinder control valve 23 via the motor electromagnetic proportional control valve 22.

In this embodiment, the engine 4 drives the working machine hydraulic pump 16 in addition to the HST pump 10. The working machine hydraulic pump 16 supplies the hydraulic oil to the lift cylinder 7 and the tilt cylinder 8 serving as working actuators for driving the working machine 5.

The forklift 1 includes an inching potentiometer (brake potentiometer) 40, an accelerator potentiometer 41, a forward-reverse lever switch 42, an engine speed sensor 43, and a vehicle speed sensor 46.

When the brake pedal (the inching pedal) 40a is operated, an inching potentiometer 40 detects and outputs an operation amount thereof. The operation amount of the brake pedal 40a is a brake opening Bs or an inching operation amount Is. The brake opening Bs or the inching operation amount Is output from the inching potentiometer 40 is input to the control device 30. In this embodiment, as indicated by a characteristic line L1 in FIG. 3, when the inching operation amount Is detected by the inching potentiometer 40 is within a range of 0% to 50%, the inching rate I changes from 100% to 0%. The inching rate I indicates a reduction ratio resulting from a predetermined swash plate tilting angle of the HST pump 10 and can be rephrased as a reduction ratio of the target absorption torque of the HST pump 10.

When the inching operation amount Is is within a range of 50% to 100%, as indicated by a characteristic line LB, a mechanical brake rate indicating effective conditions of a mechanical brake (not illustrated) changes from 0% to 100%. In addition, in the vicinity of 50% of the inching operation amount Is, an overlap region where both the inching rate I and the mechanical brake rate are 0% or more may be present. The overlap region is determined in consideration of the feeling of operation of the inching pedal 40a.

Figure 4:
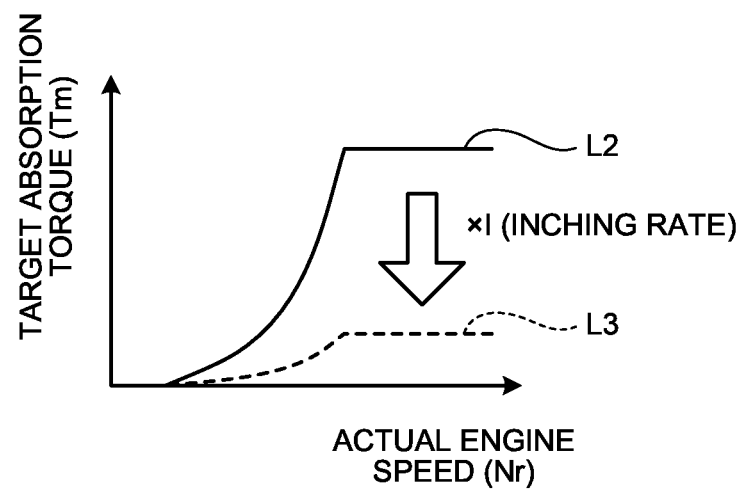
FIG. 4 is a diagram illustrating characteristic lines of a target absorption torque of an HST pump with respect to an actual engine speed.

FIG. 4 is a diagram illustrating a characteristic line L2 of a target absorption torque Tm of the HST pump 10 with respect to an actual engine speed Nr. The diagram indicates that the characteristic line L2 changes to, for example, a characteristic line L3 by multiplying the characteristic line L2 by the inching rate I. That is, the target absorption torque Tm of the HST pump 10 decreases by a decrease in the inching rate I. In this way, the inching rate I corresponds to the reduction ratio of the target absorption torque Tm of the HST pump 10. When the inching rate is 100%, the target absorption torque Tm of the HST pump 10 is not reduced, and when the inching rate is 0%, the target absorption torque Tm of the HST pump 10 becomes 0.

In this embodiment, operation in which an operator of the forklift 1 releases his foot from the brake pedal 40a to reduce or set braking force due to the mechanical brake to 0 is referred to as "opening the brake". Effecting the brake means that the operator of the forklift 1 steps on the brake pedal 40a to generate or increase the braking force due to the mechanical brake.

The accelerator potentiometer 41 outputs the operation amount As when the accelerator pedal 41a is operated. The operation amount As of the accelerator pedal 41a is also referred to as an accelerator opening As. The accelerator opening As output from the accelerator potentiometer 41 is input to the control device 30.

The forward-reverse lever switch 42 is a selection switch for inputting a traveling direction of the forklift 1. In this embodiment, the forward-reverse lever switch 42 is applied which is capable of selecting three directions of progress of a forward mode, a neutral mode, and a reverse mode by operation of the forward-reverse lever 42a provided at a position capable of being selectively operated from the driver's seat. Information indicating the traveling direction selected by the forward-reverse lever switch 42 is applied to the control device 30 as the selection information.

The engine speed sensor 43 detects an actual engine speed of the engine 4. The engine speed of the engine 4 detected by the engine speed sensor 43 is an actual engine speed Nr.

Information indicating the actual engine speed Nr is input to the control device 30. The engine speed of the engine 4 per unit time becomes a rotational speed of the engine 4. In this embodiment, the actual engine speed Nr includes the actual rotational speed of the engine 4.

The control device 30 includes a processing unit 30C and a storage unit 30M. The control device 30 is, for example, a computer. The processing unit 30C is constituted by, for example, a combination of a central processing unit (CPU) and a memory. The processing unit 30C controls the operation of the main hydraulic circuit 100, by reading a computer program for controlling the main hydraulic circuit 100 stored in the storage unit 30M and executing the commands described therein. Furthermore, the processing unit 30C determines a rate of increase of the inching rate, by reading the computer program for executing a control method of the forklift according to this embodiment and executing the commands described therein. The rate of increase of the inching rate will be described later. The storage unit 30M stores the data or the like required for the control of the above-described computer program and the main hydraulic circuit 100, and the determination of the rate of increase of the inching rate. The storage unit 30M is constituted by, for example, read only memory (ROM), a storage device or a combination thereof.

Various sensors, such as the inching potentiometer 40, the accelerator potentiometer 41, the forward-reverse lever switch 42, the engine speed sensor 43, pressure detection sensors 44 and 45, and the vehicle speed sensor 46, are electrically connected to the control device 30. Based on input signals from these various sensors, the control device 30 generates the command signals of the forward pump electromagnetic proportional control valve 12, the reverse pump electromagnetic proportional control valve 13 or the motor electromagnetic proportional control valve 22, and applies the generated command signals to the respective electromagnetic proportional control valves 12, 13, and 22.

Figure 5:
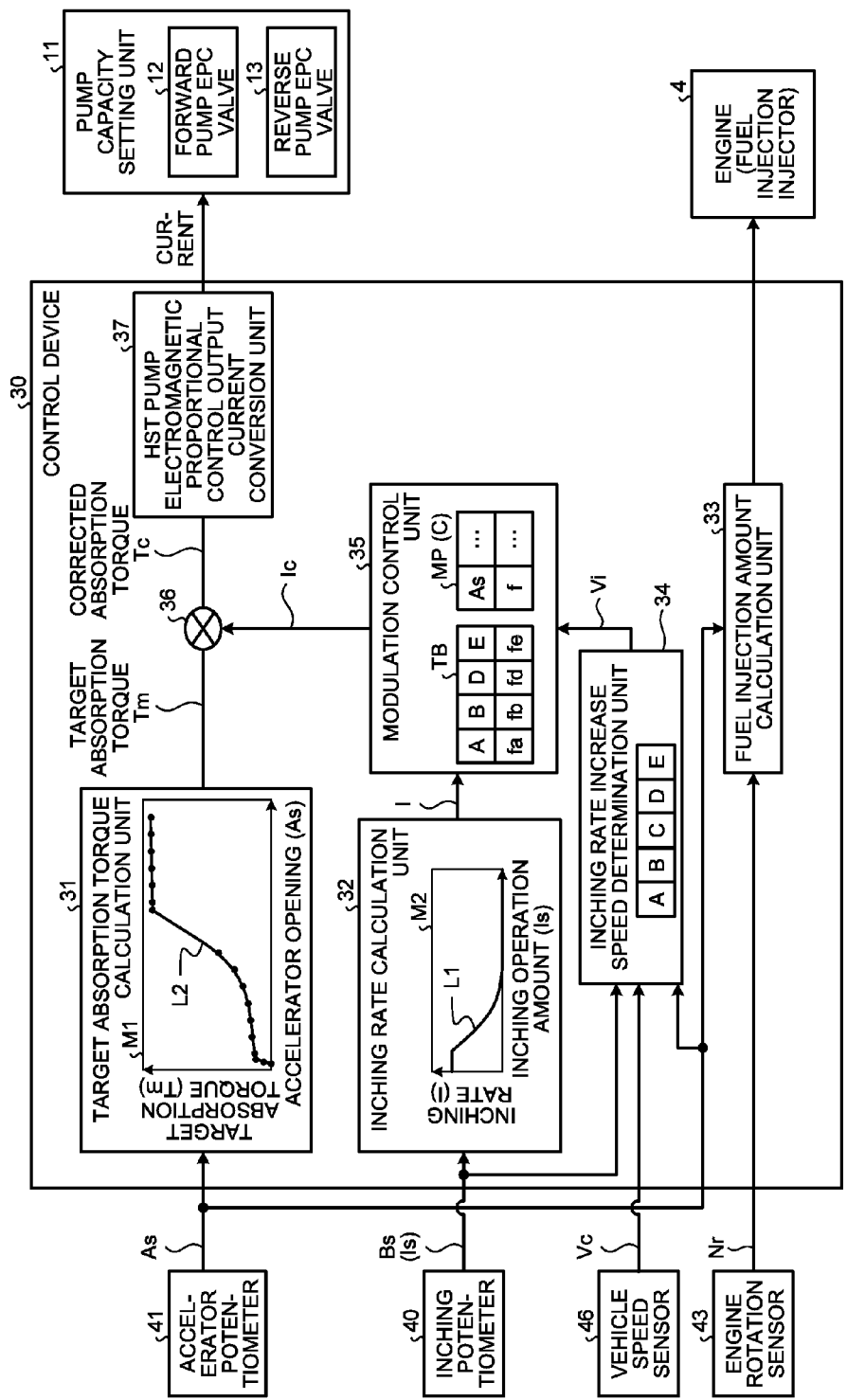
FIG. 5 is a block diagram illustrating pump control including inching control of a HST pump by a control device.

FIG. 5 is a block diagram illustrating pump control including inching control of the HST pump 10 using the control device 30. As illustrated in FIG. 5, the control device 30 includes a target absorption torque calculation unit 31, an inching rate calculation unit 32, a fuel injection amount calculation unit 33, an inching rate increase speed determination unit 34, a modulation control unit 35, a multiplication unit 36, and an HST pump electromagnetic proportional control output current conversion unit 37.

The target absorption torque calculation unit 31 calculates a target absorption torque Tm of the HST pump 10, based on an accelerator opening As detected by the accelerator potentiometer 41. The target absorption torque calculation unit 31 has a map M1 indicating the characteristics of the target absorption torque Tm with respect to the accelerator opening As. The target absorption torque calculation unit 31 calculates the target absorption torque Tm corresponding to the input accelerator opening As based on the characteristic line L2 on the map M1, and outputs the target absorption torque Tm to the multiplication unit 36.

The inching rate calculation unit 32 calculates the inching rate I based on the inching operation amount Is detected by the inching potentiometer 40. The inching rate calculation unit 32 has a map M2 indicating the characteristics of the inching rate I with respect to the inching operation amount Is. The map M2 has a characteristic line L1. The inching rate calculation unit 32 calculates the inching rate I corresponding to the input inching operation amount Is based on the characteristic line L1 on the map M2, and outputs the inching rate I to the modulation control unit 35.

In this embodiment, the inching rate increase speed determination unit 34 and the modulation control unit 35 function as an inching rate increase speed calculation unit. The function is to determine a rate of increase of the inching rate Vi (hereinafter, appropriately referred to as a rate of increase of the inching rate Vi) that is a speed at the time of increasing the inching rate I when the brake pedal 40a is opened, based on at least one of the accelerator opening As, a brake opening Bs, a rate of change Vbs of the brake opening Bs (hereinafter, appropriately referred to as a brake opening change speed Vbs) and a vehicle speed Vc.

The rate of increase of the inching rate Vi is a speed at the time of restoration (increase) of the pump capacity of the HST pump 10 when the operator of the forklift 1 releases the brake pedal 40a. If the rate of increase of the inching rate Vi is relatively large, the pump capacity of the HST pump 10 when releasing the brake pedal 40a is relatively quickly restored. If the rate of increase of the inching rate Vi is relatively small, restoration of the pump capacity of the HST pump 10 when releasing the brake pedal 40a is relatively slow.

The inching rate increase speed determination unit 34 has a plurality of patterns of the predetermined rate of increase of the inching rate Vi. On determining the rate of increase of the inching rate Vi, the inching rate increase speed determination unit 34 selects the rate of increase of the inching rate Vi from the plurality of patterns, based on at least one of the accelerator opening As, the brake opening Bs, the change speed Vbs of the brake opening Bs, and the vehicle speed Vc. The change speed Vbs of the brake opening Bs is determined by the inching rate increase speed determination unit 34 from the change of the brake opening Bs per unit time. In this embodiment, in the patterns of the rate of increase of the inching rate Vi, there are total five patterns of an A pattern, a B pattern, a C pattern, a D pattern, and an E pattern, but are not limited thereto. A selection method of the patterns of the rate of increase of the inching rate Vi will be described later.

The modulation control unit 35 generates a corrected inching rate Ic by changing the inching rate I that is input from the inching rate calculation unit 32 at an rate of increase of the inching rate Vi obtained from the pattern selected by the inching rate increase speed determination unit 34. The modulation control unit 35 outputs an inching rate I changing at the rate of increase of the inching rate Vi to the multiplication unit 36 as the corrected inching rate Ic.

On changing the rate of increase of the inching rate Vi, for example, the modulation control unit 35 changes the operation of the brake pedal 40a, specifically, response of the HST pump 10 to opening (an operation in which the operator releases the brake pedal 40a). The modulation control unit 35 sets a cut-off frequency f of the inching rate I and outputs a corrected inching rate Ic, which is delay output according to the cut-off frequency f, to the multiplication unit 36. The cut-off frequency f may be calculated by Formula (1). Symbol $\tau$ is a time constant of a primary delay element. As seen from Formula (1), the cut-off frequency f is a reciprocal of the time constant $\tau$.

$$f=1/(2\times\pi\times\tau) \qquad (1)$$

An input of the modulation control unit 35 is set to an inching rate I, and an output thereof is set to a corrected inching rate Ic. When the output with respect to the input to the modulation control unit 35 follows a first order lag, a relation between the inching rate I as the input and the corrected inching rate Ic as the output is as represented in Formula (2). Formula (3) is obtained from Formula (2).

Symbol Icb of Formula (3) represents a corrected inching rate Ic that is output from the modulation control unit 35 before a time $\Delta t$ than the corrected inching rate Ic as the output of the modulation control unit 35 at the present time.

$$Ic+\tau\times dIc/dt=I \qquad (2)$$

$$Ic+(Ic-Icb)\times\tau/\Delta t=I \qquad (3)$$

When solving Formula (3) in regard to the corrected inching rate, Formula (4) is obtained. From Formula (4), the corrected inching rate Ic is represented by a relation among the inching rate I input to the modulation control unit 35 from the inching rate calculation unit 32 at the present time, the corrected inching rate Icb output from the modulation control unit 35 before a time $\Delta t$ than the present time, the time constant $\tau$, and the time $\Delta t$. The time $\Delta t$ can be a time required for one cycle of the control. The corrected inching rate Icb can be a corrected inching rate Ic that is output from the modulation control unit 35 at the previous control cycle. The time constant $\tau$ is determined in advance. The inching rate I is an inching rate I that is output from the inching rate calculation unit 32 at the present time.

$$Ic=I\times\Delta t/(\Delta t+\tau)+Icb\times\tau/(\Delta t+\tau) \qquad (4)$$

The modulation control unit 35 delays the input inching rate I and outputs the input inching rate I as the corrected inching rate Ic. A degree of delay is set by the cut-off frequency f or the time constant $\tau$. The degree of delay decreases by increasing the cut-off frequency f (decreasing the time constant $\tau$), and the degree of delay increases by decreasing the cut-off frequency f (increasing the time constant $\tau$).

The modulation control unit 35 has a table TB and a map MP of a rate of increase of the inching rate. On the table TB, cut-off frequencies fa, fb, fd, and fe regarding four patterns of an A pattern, a B pattern, a D pattern, and an E pattern are described among the patterns of the rate of increase of the inching rate Vi. The map MP has a map MP of the rate of increase of the inching rate that is set depending on the accelerator opening As. The map MP corresponds to the C pattern among the patterns of rate of increase of the inching rate Vi.

The modulation control unit 35 outputs the input inching rate I as the corrected inching rate Ic by changing the degree of delay of the input inching rate I. For example, by increasing the cut-off frequency f, the modulation control unit 35 is able to increase the speed at which the corrected inching rate Ic gets closer to the inching rate I, and by decreasing the cut-off frequency f, the modulation control unit 35 is able to decrease the speed at which the corrected inching rate Ic gets closer to the inching rate I. In addition, the method of changing the speed at which the corrected inching rate Ic gets closer to the inching rate I by the inching rate increase speed determination unit 34 and the modulation control unit 35 is not limited to those described above.

The multiplication unit 36 multiplies the target absorption torque Tm by the corrected inching rate Ic. Moreover, the multiplication unit 36 outputs the corrected absorption torque Tc obtained by reducing the target absorption torque Tm in response to the corrected inching rate Ic to the HST pump electromagnetic proportional control output current conversion unit 37.

The HST pump electromagnetic proportional control output current conversion unit 37 as an output control unit generates the corrected absorption torque command obtained by reducing the target absorption torque Tm by the corrected inching rate Ic, and outputs the command to the pump capacity setting unit 11 of the HST pump 10. Then, the corrected inching rate Ic increases according to the rate of increase of the inching rate Vi determined by the inching rate increase speed determination unit 34. As a result, the speed, at which the pump capacity of the HST pump 10 is restored in a case where an operator of the forklift 1 opens the brake pedal 40a or in a case where an operator steps on the brake pedal 40a, changes.

The corrected absorption torque command is a signal (a current value in this embodiment) for converting the torque to be absorbed by the HST pump 10 into the corrected absorption torque Tc that is output from the multiplication unit 36. The corrected absorption torque command is output to the forward pump electromagnetic proportional control valve 12 or the reverse pump electromagnetic proportional control valve 13 of the pump capacity setting unit 11 from the HST pump electromagnetic proportional control output current conversion unit 37.

The fuel injection amount calculation unit 33 calculates an amount to be injected into the fuel injection injector of the engine 4 based on the actual engine speed Nr and the accelerator operation amount As that are input, and outputs the results to the fuel injection injector. Next, an example of control of determining the rate of increase of the inching rate Vi will be described.

(Control Example of Determining Rate of Increase of the Inching Rate Vi)

Figure 6:
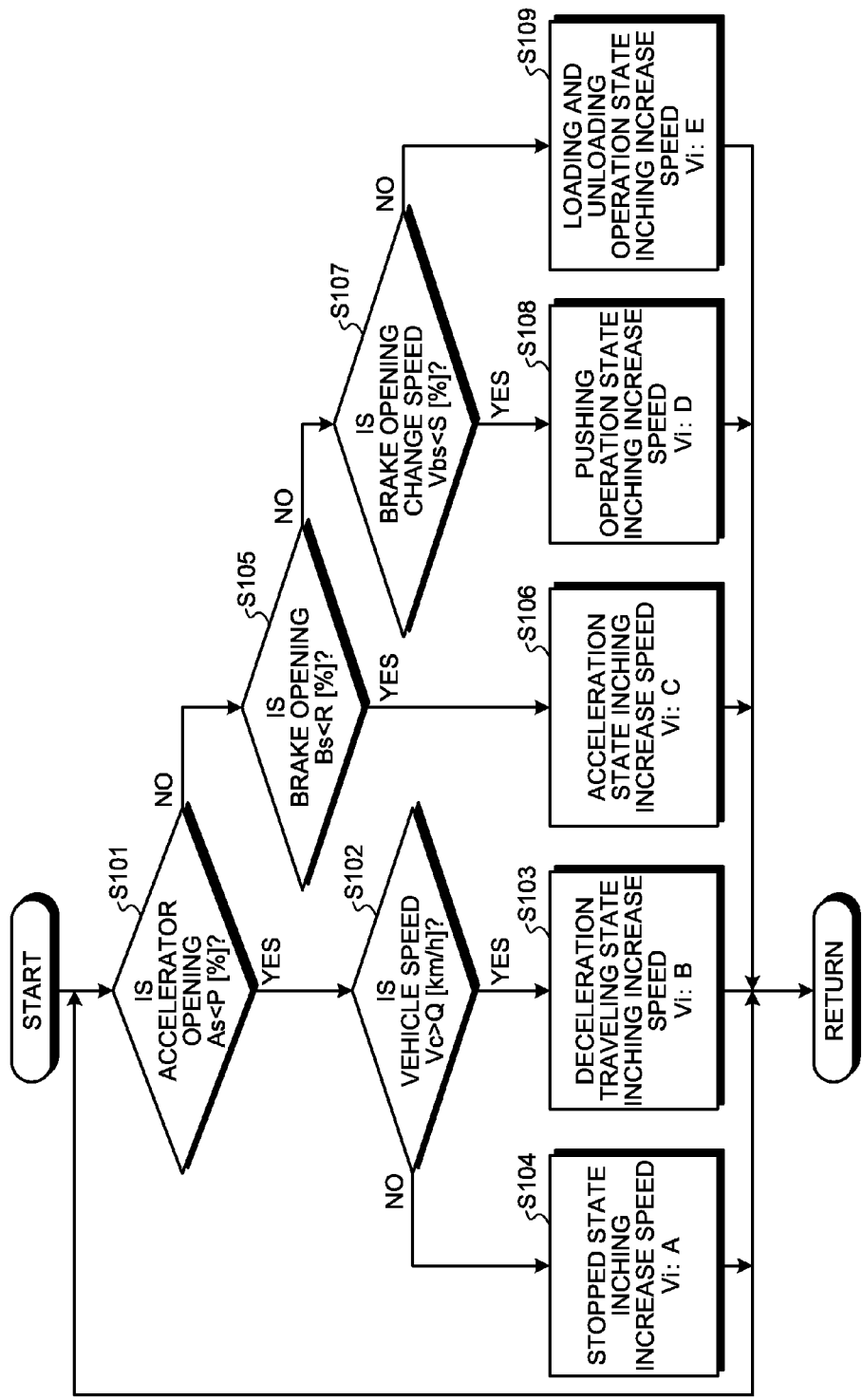
FIG. 6 is a flowchart illustrating a control example of determining a rate of increase of an inching rate.
Figure 7:
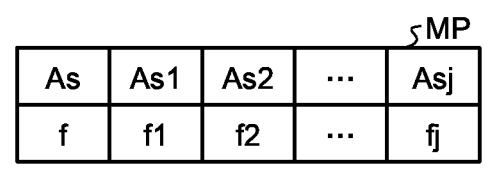

FIG. 6 is a flowchart illustrating a control example of determining the rate of increase of the inching rate Vi. FIG. 7 is a diagram illustrating an example of a map of the rate of increase of the inching rate Vi that is used in a state in which the accelerator opening As is equal to or greater than a predetermined accelerator opening threshold and the brake opening Bs is less than a predetermined brake opening threshold. The control device 30 illustrated in FIGS. 1 and 5 determines the rate of increase of the inching rate Vi by executing a control method of the forklift according to this embodiment.

In Step S101, the control device 30 illustrated in FIGS. 1 and 5, more specifically, the inching rate increase speed determination unit 34 illustrated in FIG. 5 acquires the accelerator opening As from the accelerator potentiometer 41 and compares the accelerator opening As with a predetermined accelerator opening threshold P [%]. In Step S101, it is determined whether the accelerator is ON or OFF. The accelerator opening threshold P is set to a value suitable for this determination.

When the accelerator opening As is less than the accelerator opening threshold P (Yes in Step S101), the accelerator is OFF. In this case, in Step S102, the inching rate increase speed determination unit 34 compares the vehicle speed Vc of the forklift 1 acquired from the vehicle speed sensor 46 illustrated in FIG. 5 with a predetermined vehicle speed threshold Q. In Step S102, it is determined whether the forklift 1 travels or stops. The vehicle speed threshold Q is set to a value suitable for this determination.

When the vehicle speed Vc is greater than a predetermined vehicle speed threshold Q [km/h] (Yes in Step S102), the forklift 1 is traveling at a reduced speed. In this case, in Step S103, the inching rate increase speed determination unit 34 determines the rate of increase of the inching rate Vi to the pattern B. When the vehicle speed Vc is equal to or less than a predetermined vehicle speed threshold Q [km/h] (No in Step S102), the forklift 1 is stopping. In this case, in Step S104, the inching rate increase speed determination unit 34 determines the rate of increase of the inching rate Vi to the pattern A.

Returning to Step S101, when the accelerator opening As is equal to or greater than the accelerator opening threshold P (No in Step S101), in Step S105, the inching rate increase speed determination unit 34 acquires a brake opening Bs from the inching potentiometer 40, and compare the brake opening Bs with a predetermined brake opening threshold R [%]. In Step S105, it is determined whether an acceleration state by single operation of the accelerator is simultaneous operation of the accelerator and the brake. The brake opening threshold R is set to a value suitable for this determination. When the brake opening Bs is less than the brake opening threshold R (Yes in Step S105), the forklift 1 is being accelerated by the single operation of the accelerator. In this case, in Step S106, the inching rate increase speed determination unit 34 determines the rate of increase of the inching rate Vi to the pattern C.

Returning to Step S105, when the brake opening Bs is equal to or greater than the brake opening threshold R (No in Step S105), the accelerator and the brake are simultaneously operated. In this case, in Step S107, the inching rate increase speed determination unit 34 compares the brake opening change speed Vbs with a predetermined opening change threshold S [%].

The brake opening Bs becomes 0% in a state in which the brake pedal 40a illustrated in FIG. 1 is not stepped on. As the brake pedal 40a is stepped on, a numerical value of the brake opening Bs increases. That is, in this embodiment, when the brake is opened, the value of the brake opening Bs decreases, and when the brake is closed, the value of the brake opening Bs increases. Since the brake opening change speed Vbs indicates how much the brake opening Bs changes at a predetermined time, when the brake is opened, the brake opening change speed Vbs becomes a negative value. Furthermore, when the brake is opened, it is determined whether the brake pedal 40a is opened at once. The opening change threshold S is set to a value suitable for this determination. In Step S107, if the brake opening change speed Vbs becomes smaller, that is, if an absolute value of the brake opening change speed Vbs increases, the speed at which the brake pedal 40a is opened, increases.

When the brake opening change speed Vbs is less than the opening change threshold S (Yes in Step S107), the accelerator and the brake are simultaneously operated, and the brake pedal 40a is opened at once at that time. This state indicates that the forklift 1 is in a pushing operation state. The pushing operation is operation in which the forklift 1 pushes the transported article or pulls out the fork 6 illustrated in FIG. 1 from the gap of the load. The pushing operation can be achieved by increasing the rotational speed of the engine 4 in the stopped state, and then opening the brake at once to rapidly accelerate the forklift 1. In this case, in Step S108, the inching rate increase speed determination unit 34 determines the rate of increase of the inching rate Vi to the pattern D.

When the brake opening change speed Vbs is equal to or greater than the opening change threshold S (NO in Step S107), since it is possible to determine that the operator of the forklift 1 performs the work with stepping on the brake pedal 40a, the forklift 1 is believed to be in the loading and unloading operation state. In this case, in Step S109, the inching rate increase speed determination unit 34 determines the rate of increase of the inching rate Vi to the pattern E. The above-described patterns A, B, C, D, and E are set to be the different rate of increase of the inching rate Vi depending on each of the states of the forklift 1.

For example, the rate of increase of the inching rate Vi of the pattern E, that is, the rate of increase of the inching rate Vi during loading and unloading operation is set to be smaller than the rate of increase of the inching rate Vi of the pattern D, that is, the rate of increase of the inching rate Vi during pushing operation. For example, the cut-off frequency f of the pattern E is set to be smaller than the cut-off frequency f of the pattern D. In this way, the rate of increase of the inching rate Vi during loading and unloading operation can be set to be smaller than the rate of increase of the inching rate Vi during pushing operation. As a result, even when the operator of the forklift 1 releases the brake pedal 40a too much by mistake during loading and unloading operation, since the rate of increase of the inching rate Vi of the pattern E is applied, it is possible to suppress the rapid acceleration of the forklift 1. For this reason, since the rapid increase in vehicle speed Vc is suppressed even when the operator releases the brake pedal 40a too much, it is possible to suppress hitting of load due to rapid acceleration or collapse of load due to sudden braking. As a result, it is possible to reduce the burden of the operation of the operator. Furthermore, when an operator performs the pushing operation, since the rate of increase of the inching rate Vi of the pattern D is applied, intention of the operator is preferred, with the result that the pushing work can be easily achieved.

The rate of increase of the inching rate Vi of the pattern A, that is, the rate of increase of the inching rate Vi in the stopped state is set to be smaller than the rate of increase of the inching rate Vi of the pattern B, that is, the rate of increase of the inching rate Vi in the decelerated traveling state. In this way, the rate of increase of the inching rate Vi of the pattern A is applied. For this reason, when releasing the brake pedal 40a after the forklift 1 stops, since the speed at which the pump capacity of the HST pump 10 is restored is suppressed, it is possible to prevent the forklift 1 from restarting. In addition, during decelerated traveling of the forklift 1, the rate of increase of the inching rate Vi of the pattern B is applied. Therefore, since it is possible to ensure the control performance of the braking force due to the HST pump 10 using the brake pedal 40a during decelerated traveling of the forklift 1, for example, the operator of the forklift 1 is able to stop the forklift 1 easily at position desired to stop.

The rate of increase of the inching rate Vi of the pattern E, that is, the rate of increase of the inching rate Vi during loading and unloading operation may increase in accordance with an increase in the accelerator opening As. In this way, after an operator steps on the brake pedal 40a and then opens the brake pedal 40a during loading and unloading operation of the forklift 1, when an operator slightly steps on the accelerator pedal 41a, the forklift 1 is not rapidly accelerated, and when an operator greatly steps on the accelerator pedal 41a, the forklift 1 can be strongly accelerated.

The rate of increase of the inching rate Vi of the pattern C, that is, the rate of increase of the inching rate Vi in the accelerated state of the forklift 1 may be determined by, for example, the map MP of the rate of increase of the inching rate illustrated in FIG. 7 that is set depending on the accelerator opening As. On the map MP, cut-off frequencies f1, f2, . . . fj for determining the rate of increase of the inching rate Vi in response to the accelerator opening As of As1, As2, . . . Asj are described. The accelerator opening As becomes larger in the order of As1, As2, . . . Asj, and the cut-off frequency f becomes larger in the order of f1, f2, . . . fj (j is an integer equal to or greater than 1). That is, the map MP is determined so that as the accelerator opening As increases, the rate of increase of the inching rate Vi increases. In this way, during acceleration of the forklift 1, when an operator slightly steps on the accelerator pedal 41a, the forklift 1 is not rapidly accelerated, and when greatly stepping on the accelerator pedal 41a, the forklift 1 can be strongly accelerated. Thus, the control device 30 and the forklift 1 including the same are able to achieve suitable inching control in the aspect of various works of the forklift including the HST.

The embodiment has been described above, but the embodiment is not limited by the foregoing description. Furthermore, the above-described components include components capable of being easily assumed by an ordinary person skilled in the art, components that are substantially the same, and so-called components within the range of equivalents. Furthermore, the above-described components can be appropriately combined. In addition, it is possible to perform at least one of various omissions, substitutions, and modifications without departing from the scope of the embodiment.

REFERENCE SIGNS LIST

1 FORKLIFT
2a DRIVING WHEELS
4 ENGINE
5 WORKING MACHINE
10 HYDRAULIC PUMP (HST PUMP)
11 PUMP CAPACITY SETTING UNIT
12 FORWARD PUMP ELECTROMAGNETIC PROPORTIONAL CONTROL VALVE
13 REVERSE PUMP ELECTROMAGNETIC PROPORTIONAL CONTROL VALVE
14 PUMP CAPACITY CONTROL CYLINDER
16 WORKING MACHINE HYDRAULIC PUMP
20 HYDRAULIC MOTOR (HST MOTOR)
21 MOTOR CAPACITY SETTING UNIT
30 CONTROL UNIT
30C PROCESSING UNIT
30M STORAGE UNIT
31 TARGET ABSORPTION TORQUE CALCULATION UNIT
32 INCHING RATE CALCULATION UNIT
33 FUEL INJECTION AMOUNT CALCULATION UNIT
34 INCHING RATE INCREASE SPEED DETERMINATION UNIT
35 MODULATION CONTROL UNIT
36 MULTIPLICATION UNIT
37 HST PUMP ELECTROMAGNETIC PROPORTIONAL CONTROL OUTPUT CURRENT CONVERSION UNIT
40 INCHING POTENTIOMETER
40a BRAKE PEDAL (INCHING PEDAL)
41 ACCELERATOR POTENTIOMETER
41a ACCELERATOR PEDAL
43 ENGINE SPEED SENSOR
46 VEHICLE SPEED SENSOR
100 MAIN HYDRAULIC CIRCUIT

The invention claimed is:
1. A forklift including:
a variable displacement hydraulic pump driven by an engine;
a hydraulic motor that forms a closed circuit with the hydraulic pump and is driven by hydraulic oil discharged from the hydraulic pump; and
driving wheels driven by the hydraulic motor,
the forklift further comprising:
a vehicle speed sensor configured to detect a vehicle speed of the forklift;
an accelerator opening sensor configured to detect an accelerator opening that indicates an operation amount of an accelerator pedal for changing an
amount of fuel supplied to the engine;
a brake pedal that is used to brake the forklift and
controls an inching rate which is a reduction ratio
resulting from a tilting angle of a swash plate of the
hydraulic pump;
an inching rate calculation unit configured to calculate
the inching rate corresponding to an operation
amount of the brake pedal; and
an inching rate increase speed calculation unit configured to determine a rate of increase of the inching
rate, based on at least one of the accelerator opening,
a brake opening indicating the operation amount of
the brake pedal, a rate of change of the brake
opening, and the vehicle speed detected by the
vehicle speed sensor,
wherein in a state in which the accelerator opening is less
than a predetermined accelerator opening threshold,
the rate of increase of the inching rate in a case where the
vehicle speed is equal to or less than a predetermined
vehicle speed threshold is smaller than the rate of
increase of the inching rate in a case where the vehicle
speed is higher than the vehicle speed threshold.

2. A forklift including:
a variable displacement hydraulic pump driven by an engine;
a hydraulic motor that forms a closed circuit with the hydraulic pump and is driven by hydraulic oil discharged from the hydraulic pump; and
driving wheels driven by the hydraulic motor,
the forklift further comprising:
a vehicle speed sensor configured to detect a vehicle speed of the forklift;
an accelerator opening sensor configured to detect an accelerator opening that indicates an operation amount of an accelerator pedal for changing an amount of fuel supplied to the engine;
a brake pedal that is used to brake the forklift and controls an inching rate which is a reduction ratio resulting from a tilting angle of a swash plate of the hydraulic pump;
an inching rate calculation unit configured to calculate the inching rate corresponding to an operation amount of the brake pedal; and
an inching rate increase speed calculation unit configured to determine a rate of increase of the inching rate, based on at least one of the accelerator opening, a brake opening indicating the operation amount of the brake pedal, a rate of change of the brake opening, and the vehicle speed detected by the vehicle speed sensor,
wherein in a state in which the accelerator opening is equal to or greater than a predetermined accelerator opening threshold and the brake opening is equal to or greater than a predetermined opening threshold,
the rate of increase of the inching rate in a case where the rate of change of the brake opening is equal to or greater than a predetermined opening change threshold is smaller than the rate of increase of the inching rate in a case where the rate of change of the brake opening is less than the opening change threshold.

3. A forklift including:
a variable displacement hydraulic pump driven by an engine;
a hydraulic motor that forms a closed circuit with the hydraulic pump and is driven by hydraulic oil discharged from the hydraulic pump; and
driving wheels driven by the hydraulic motor,
the forklift further comprising:
a vehicle speed sensor configured to detect a vehicle speed of the forklift;
an accelerator opening sensor configured to detect an accelerator opening that indicates an operation amount of an accelerator pedal for changing an amount of fuel supplied to the engine;
a brake pedal that is used to brake the forklift and controls an inching rate which is a reduction ratio resulting from a tilting angle of a swash plate of the hydraulic pump;
an inching rate calculation unit configured to calculate the inching rate corresponding to an operation amount of the brake pedal; and
an inching rate increase speed calculation unit configured to determine a rate of increase of the inching rate, based on at least one of the accelerator opening, a brake opening indicating the operation amount of the brake pedal, a rate of change of the brake opening, and the vehicle speed detected by the vehicle speed sensor,
wherein in a state in which the accelerator opening is equal to or greater than a predetermined accelerator opening threshold and the brake opening is equal to or greater than a predetermined brake opening threshold,
the rate of increase of the inching rate in a case where the rate of change of the brake opening is equal to or greater than a predetermined opening change threshold increases in accordance with an increase in the accelerator opening.

4. A forklift including:
a variable displacement hydraulic pump driven by an engine;
a hydraulic motor that forms a closed circuit with the hydraulic pump and is driven by hydraulic oil discharged from the hydraulic pump; and
driving wheels driven by the hydraulic motor,
the forklift further comprising:
a vehicle speed sensor configured to detect a vehicle speed of the forklift;
an accelerator opening sensor configured to detect an accelerator opening that indicates an operation amount of an accelerator pedal for changing an amount of fuel supplied to the engine;
a brake pedal that is used to brake the forklift and controls an inching rate which is a reduction ratio resulting from a tilting angle of a swash plate of the hydraulic pump;
an inching rate calculation unit configured to calculate the inching rate corresponding to an operation amount of the brake pedal; and
an inching rate increase speed calculation unit configured to determine a rate of increase of the inching rate, based on at least one of the accelerator opening, a brake opening indicating the operation amount of the brake pedal, a rate of change of the brake opening, and the vehicle speed detected by the vehicle speed sensor,
wherein in a state in which the accelerator opening is equal to or greater than a predetermined accelerator opening threshold and the brake opening is less than a predetermined brake opening threshold,
the rate of increase of the inching rate is determined by a map of the rate of increase of the inching rate that is set depending on the accelerator opening.

5. The forklift according to claim 4,
wherein the rate of increase of the inching rate increases in accordance with an increase in the accelerator opening.

6. A method of controlling a forklift including: a variable displacement hydraulic pump driven by an engine; a hydraulic motor that forms a closed circuit with the hydraulic pump and is driven by hydraulic oil discharged from the hydraulic pump; and driving wheels driven by the hydraulic motor, the method comprising:
    determining an rate of increase of an inching rate as a reduction ratio resulting from a tilting angle of a swash plate included in the hydraulic pump, based on at least one of an accelerator opening indicating an operation amount of an accelerator pedal for changing an amount of fuel supplied to the engine, a brake opening indicating an operation amount of a brake pedal used for braking the forklift, a rate of change of the brake opening, and a vehicle speed of the forklift detected by a vehicle speed sensor,
    wherein in a state in which the accelerator opening is less than a predetermined accelerator opening threshold,
    the rate of increase of the inching rate in a case where the vehicle speed is equal to or less than a predetermined vehicle speed threshold is smaller than the rate of increase of the inching rate in a case where the vehicle speed is higher than the vehicle speed threshold.

7. A method of controlling a forklift including: a variable displacement hydraulic pump driven by an engine; a hydraulic motor that forms a closed circuit with the hydraulic pump and is driven by hydraulic oil discharged from the hydraulic pump; and driving wheels driven by the hydraulic motor, the method comprising:
    determining an rate of increase of an inching rate as a reduction ratio resulting from a tilting angle of a swash plate included in the hydraulic pump, based on at least one of an accelerator opening indicating an operation amount of an accelerator pedal for changing an amount of fuel supplied to the engine, a brake opening indicating an operation amount of a brake pedal used for braking the forklift, a rate of change of the brake opening, and a vehicle speed of the forklift detected by a vehicle speed sensor,
    wherein in a state in which the accelerator opening is equal to or greater than a predetermined accelerator opening threshold and the brake opening is equal to or greater than a predetermined opening threshold,
    the rate of increase of the inching rate in a case where the rate of change of the brake opening is equal to or greater than a predetermined opening change threshold is smaller than the rate of increase of the inching rate in a case where the rate of change of the brake opening is less than the opening change threshold.

8. A method of controlling a forklift including: a variable displacement hydraulic pump driven by an engine; a hydraulic motor that forms a closed circuit with the hydraulic pump and is driven by hydraulic oil discharged from the hydraulic pump; and driving wheels driven by the hydraulic motor, the method comprising:
    determining an rate of increase of an inching rate as a reduction ratio resulting from a tilting angle of a swash plate included in the hydraulic pump, based on at least one of an accelerator opening indicating an operation amount of an accelerator pedal for changing an amount of fuel supplied to the engine, a brake opening indicating an operation amount of a brake pedal used for braking the forklift, a rate of change of the brake opening, and a vehicle speed of the forklift detected by a vehicle speed sensor,
    wherein in a state in which the accelerator opening is equal to or greater than a predetermined accelerator opening threshold and the brake opening is equal to or greater than a predetermined brake opening threshold,
    the rate of increase of the inching rate in a case where the rate of change of the brake opening is equal to or greater than a predetermined opening change threshold increases in accordance with an increase in the accelerator opening.

9. A method of controlling a forklift including: a variable displacement hydraulic pump driven by an engine; a hydraulic motor that forms a closed circuit with the hydraulic pump and is driven by hydraulic oil discharged from the hydraulic pump; and driving wheels driven by the hydraulic motor, the method comprising:
    determining an rate of increase of an inching rate as a reduction ratio resulting from a tilting angle of a swash plate included in the hydraulic pump, based on at least one of an accelerator opening indicating an operation amount of an accelerator pedal for changing an amount of fuel supplied to the engine, a brake opening indicating an operation amount of a brake pedal used for braking the forklift, a rate of change of the brake opening, and a vehicle speed of the forklift detected by a vehicle speed sensor,
    wherein in a state in which the accelerator opening is equal to or greater than a predetermined accelerator opening threshold and the brake opening is less than a predetermined brake opening threshold,
    the rate of increase of the inching rate is determined by a map of the rate of increase of the inching rate that is set depending on the accelerator opening.

10. The method of controlling a forklift according to claim 9,
wherein the rate of increase of the inching rate increases in accordance with an increase in the accelerator opening.

* * * * *